United States Patent
Ando et al.

(10) Patent No.: US 11,525,065 B2
(45) Date of Patent: *Dec. 13, 2022

(54) OIL-BASED INKJET INK

(71) Applicant: RISO KAGAKU CORPORATION, Tokyo (JP)

(72) Inventors: Kazuyuki Ando, Ibaraki (JP); Shinichiro Shimura, Ibaraki (JP); Marie Morinaga, Ibaraki (JP); Hikaru Sugiura, Ibaraki (JP); Shinsuke Ozawa, Ibaraki (JP); Noriaki Sugawara, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 640 days.

This patent is subject to a terminal disclaimer.

(21) Appl. No.: 16/497,725

(22) PCT Filed: Mar. 26, 2018

(86) PCT No.: PCT/JP2018/012116
§ 371 (c)(1),
(2) Date: Sep. 25, 2019

(87) PCT Pub. No.: WO2018/181169
PCT Pub. Date: Oct. 4, 2018

(65) Prior Publication Data
US 2020/0017702 A1    Jan. 16, 2020

(30) Foreign Application Priority Data
Mar. 30, 2017    (JP) .............................. JP2017-067840

(51) Int. Cl.
| | |
|---|---|
| C09D 11/36 | (2014.01) |
| C09D 11/326 | (2014.01) |
| C09D 11/037 | (2014.01) |
| C09D 11/033 | (2014.01) |
| C09D 11/322 | (2014.01) |
| C09D 11/324 | (2014.01) |
| D06P 5/30 | (2006.01) |
| D06P 7/00 | (2006.01) |

(52) U.S. Cl.
CPC ............ *C09D 11/36* (2013.01); *C09D 11/033* (2013.01); *C09D 11/037* (2013.01); *C09D 11/322* (2013.01); *C09D 11/324* (2013.01); *C09D 11/326* (2013.01); *D06P 5/30* (2013.01); *D06P 7/005* (2013.01)

(58) Field of Classification Search
None
See application file for complete search history.

(56) References Cited

U.S. PATENT DOCUMENTS

| | | | |
|---|---|---|---|
| 7,393,400 B2 | 7/2008 | Kitawaki et al. |
| 7,897,657 B2 | 3/2011 | Nakano et al. |
| 8,292,996 B2 | 10/2012 | Kuriyama et al. |
| 10,640,665 B2 | 5/2020 | Seki et al. |
| 10,865,320 B2 | 12/2020 | Shimura et al. |
| 2007/0022904 A1 | 2/2007 | Kitawaki et al. |
| 2007/0101901 A1 | 5/2007 | Endo et al. |
| 2009/0090271 A1 | 4/2009 | Wynants et al. |
| 2010/0174013 A1 | 7/2010 | Sugita et al. |
| 2012/0056929 A1 | 3/2012 | Sao et al. |
| 2012/0266779 A1 | 10/2012 | Morinaga et al. |
| 2012/0293581 A1 | 11/2012 | Aoki et al. |
| 2013/0113866 A1 | 5/2013 | Shimomura |
| 2015/0184012 A1 | 7/2015 | Endo et al. |
| 2017/0165966 A1 | 6/2017 | Ito et al. |

FOREIGN PATENT DOCUMENTS

| | | |
|---|---|---|
| CN | 101198664 | 6/2008 |
| CN | 101560347 | 10/2009 |
| CN | 101688078 | 3/2010 |
| CN | 102190926 | 9/2011 |
| CN | 103146243 | 6/2013 |
| CN | 106133072 | 11/2016 |
| CN | 108504191 | 9/2018 |
| EP | 3604461 | 2/2020 |
| JP | 57-6790 | 1/1982 |
| JP | 2002-363465 | 12/2002 |

(Continued)

OTHER PUBLICATIONS

Extended European Search Report, European Patent Application No. 18164498.0, dated Jul. 12, 2018 (6 pages).
International Search Report and Written Opinion issued for International Patent Application No. PCT/JP2018/012116, dated May 15, 2018, 8 pages.
International Search Report and Written Opinion issued for International Patent Application No. PCT/JP2018/012118, dated May 15, 2018, 8 pages.
International Search Report and Written Opinion issued for International Patent Application No. PCT/JP2018/012119, dated May 15, 2018, 9 pages.

(Continued)

*Primary Examiner* — Katie L. Hammer
(74) *Attorney, Agent, or Firm* — Hamre, Schumann, Mueller & Larson, P.C.

(57) ABSTRACT

Provided is an oil-based inkjet ink containing a pigment and a fatty acid ester-based solvent represented by general formula (1) shown below and having at least 18 but not more than 29 carbon atoms per molecule. In general formula (1), $R^1$ represents an alkyl group of 5 or more carbon atoms, $R^2$ represents an alkyl group of 6 or more carbon atoms, and at least one of $R^1$ and $R^2$ is a branched alkyl group of 9 or more carbon atoms having a side chain of 4 or more carbon atoms.

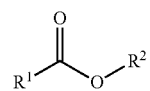

(1)

11 Claims, No Drawings

(56) References Cited

FOREIGN PATENT DOCUMENTS

| JP | 2005-171032 | 6/2005 |
|---|---|---|
| JP | 2007-126564 | 5/2007 |
| JP | 2007-154149 | 6/2007 |
| JP | 2010-215700 | 9/2010 |
| JP | 2011-162757 | 8/2011 |
| JP | 2012-0052057 | 3/2012 |
| JP | 2012-224781 | 11/2012 |
| JP | 2012254620 | 12/2012 |
| JP | 2013-072057 | 4/2013 |
| JP | 2013-095885 | 5/2013 |
| JP | 2014-019766 | 2/2014 |
| JP | 2015-124381 | 7/2015 |
| JP | 2006-065200 | 4/2016 |
| JP | 2016-191028 | 11/2016 |
| JP | 2017-105046 | 6/2017 |

OTHER PUBLICATIONS

International Search Report and Written Opinion issued for International Patent Application No. PCT/JP2018/012120, dated May 15, 2018, 10 pages.
Official Action issued for the counterpart European Patent Application No. 18164498.0, dated Nov. 19, 2020, 23 pages.
Office Action issued for the counterpart Chinese patent application No. 201880020540.2, dated Aug. 2, 2021, 7 pages.
Zhang Dengxia, Polyacrylate transparent plastics, petrochemical industry press, Aug. 1975, 1st edition, p. 47; English translation provided.
Encyclopedia of Chemical Engineering (vol. 19), editorial board of Encyclopedia of chemical engineering, chemical industry press, Sep. 1998, 1st edition, p. 231; English translation provided.
Office Action issued for the counterpart Chinese application No. 201810266246.1, dated Apr. 19, 2021, 10 pages.
Office Action, U.S. Appl. No. 15/935,384, dated Jan. 6, 2021, 31 pages.
Office Action issued for the counterpart Chinese patent application No. 201880020390.5, dated Jul. 19, 2021, 7 pages.
Peng Shi-song et al., Chemical Industry Review, 1st edition, 1989, pp. 280-282; Discussed on p. 3 of the attached Chinese Office Action.
Jiang Xuesong et al., Printing Materials and Suitability, 2nd edition, 2016, pp. 140-143; Discussed on p. 3 of the attached Chinese Office Action.
Office Action issued for Chinese Patent Application No. 201880020496.5, dated Oct. 8, 2021, 10 pages including English translation.
Yǒujī huàxué, "Organic chemistry" 21S Hiji Gaodeng Yuanxiao, Yingyongxing Guihua Jiocai, Apr. 2009, p. 172-173; A concise explanation of relevance provided in the attached Chinese Office Action.
Office Action issued for the counterpart Chinese Patent Application No. 201810266246.1, dated Oct. 10, 2020, 15 pages including machine translation.

OIL-BASED INKJET INK

TECHNICAL FIELD

The present invention relates to an oil-based inkjet ink.

BACKGROUND ART

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

Colorants for inks can be broadly classified into dyes and pigments. Using a dye offers the advantage of particularly favorable color development. Further, compared with pigments, dyes offer the advantage of superior abrasion resistance. However, dyes themselves exhibit inferior water resistance and marker resistance. On the other hand, pigments offer the advantages of high image density and excellent weather resistance, but exhibit inferior abrasion resistance compared with dyes.

In one example of an inkjet printing device, the ink is stored in an ink tank, and is transported from the ink tank through a resin tube to the inkjet nozzles. A problem arises in that this resin tube is degraded by the ink, and particularly the non-aqueous solvent in the ink.

Further, in a pigment ink, following discharge of the ink onto a recording medium, the non-aqueous solvent penetrates rapidly into the interior of the recording medium, allowing the printed item to dry, whereas the pigment is retained at the surface of the recording medium, meaning the image density can be enhanced.

In an inkjet printing device, when a printed item is sandwiched between rollers and transported following printing, a problem known as roller transfer contamination can sometimes occur in which ink adheres to a roller that contacts the printed item, and that ink is then transferred from the roller and readheres to a following print region or a subsequent printed item, causing contamination of the printed item.

Patent Document 1 proposes an inkjet non-aqueous ink composition having superior discharge stability that neither swells nor greatly deforms transparent files, the ink containing a pigment, a dispersant and a non-aqueous solvent, wherein at least 50% of the total weight of the non-aqueous solvent is composed of an ester-based solvent having at least 24 but not more than 36 carbon atoms.

In order to prevent an alcohol odor from the printed items, Patent Document 2 proposes an ink containing a pigment, a dispersant and a solvent, wherein the solvent contains a specific fatty acid ester. Examples of the fatty acid ester solvent in Patent Document 2 include isodecyl neopentanoate, isostearyl neopentanoate, octyldodecyl neopentanoate, and octyldodecyl neodecanoate and the like.

PRIOR ART DOCUMENTS

Patent Documents

Patent Document 1: JP 2007-154149 A
Patent Document 2: JP 2011-162757 A

SUMMARY OF THE INVENTION

Problems to be Solved by the Invention

Because ester-based solvents having a high carbon number have comparatively high viscosities, inks that use these ester-based solvents tend to suffer from slow penetration speeds of the ink into the recording medium and poor separation properties, meaning the problem of roller transfer contamination is more likely to occur. Further, in Patent Document 1, in those cases where an ester-based solvent having a high carbon number is added to the ink, the ink is heated to lower the viscosity before discharge. In this case, when the temperature of the ink falls following discharge onto the recording medium, the viscosity of ink on the recording medium increases and the solvent becomes more difficult to separate, meaning the problem of roller transfer contamination is more likely to occur.

Further, even with an ester-based solvent having a high carbon number, if the alkyl chains are linear or the side chains are too short, then degradation of the resin tubes, and particularly vinyl chloride tubes, can sometimes not be adequately prevented.

For example, although the isocetyl 2-ethylhexanoate used in Patent Document 1 has a carbon number of 24, the number of carbon atoms in the side chain on the fatty acid side is only 2, and the number of carbon atoms in the side chain on the alcohol side is unknown. Accordingly, there is a possibility that degradation of vinyl chloride tubes will still occur. Because the vinyl chloride tubes make direct contact with the ink, they are more strongly affected by the ink than the level of clear file deformation caused by the printed items.

The inks of Comparative Examples 1 to 6 in Patent Document 1 use ester-based solvents having a carbon number of 18 to 23, but because the branched structure is not specified, deformation of transparent films occurred. Ester-based solvents having a low carbon number have a comparatively low viscosity and are useful for improving the discharge performance, but tend to cause clear file deformation.

The octyldodecyl neopentanoate used in Patent Document 2 has a low carbon number for the fatty acid portion, and therefore there is a possibility that degradation of vinyl chloride tubes will occur. Further, neopentanoic acid, which is a decomposition product of octyldodecyl neopentanoate, has a low carbon number and can cause odors.

The octyldodecyl neodecanoate used in Patent Document 2 has 30 carbon atoms per molecule, and therefore following ink discharge, penetration into the recording medium tends to be slow, and there is a possibility that roller transfer contamination may occur.

An object of the present invention is to prevent the degradation of resin products by the ink, and prevent roller transfer contamination during the printing steps.

Means to Solve the Problems

One embodiment of the present invention provides an oil-based inkjet ink containing a pigment and a fatty acid ester-based solvent represented by general formula (1) shown below and having at least 18 but not more than 29 carbon atoms per molecule.

General formula (1)

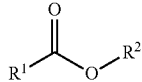

(In general formula (1),
$R^1$ represents an alkyl group of 5 or more carbon atoms,
$R^2$ represents an alkyl group of 6 or more carbon atoms, and
at least one of $R^1$ and $R^2$ is a branched alkyl group of 9 or more carbon atoms having a side chain of 4 or more carbon atoms.)

Effects of the Invention

Embodiments of the present invention are able to prevent the degradation of resin products by the ink, and prevent roller transfer contamination during the printing steps.

EMBODIMENTS FOR CARRYING OUT THE INVENTION

The present invention is described below using embodiments. However, the examples presented in the following embodiments in no way limit the present invention.

An oil-based inkjet ink according to one embodiment (hereafter also referred to as simply "the ink") contains a pigment and a fatty acid ester-based solvent represented by general formula (1) shown below and having at least 18 but not more than 29 carbon atoms per molecule.

General formula (1)

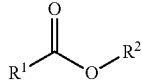

(In general formula (1), $R^1$ represents an alkyl group of 5 or more carbon atoms, $R^2$ represents an alkyl group of 6 or more carbon atoms, and at least one of $R^1$ and $R^2$ is a branched alkyl group of 9 or more carbon atoms having a side chain of 4 or more carbon atoms.)

This embodiment is able to prevent the degradation of resin products by the ink, and prevent roller transfer contamination during the printing steps.

One example of an inkjet printing device has an ink tank in which the ink is stored and inkjet nozzles that discharge the ink onto a recording medium, and the ink is transported from the ink tank to the inkjet nozzles through a tube. A vinyl chloride tube is sometimes used for this tube. A problem can arise in that this vinyl chloride tube is degraded by the non-aqueous solvent in the ink. Degradation of the tube can not only damage the tube, but can also lead to another problem in which impurities leach into the ink from the tube, causing a deterioration in the ink.

Fatty acid esters are commonly used as plasticizers for resins such as vinyl chloride resins. Plasticizers penetrate between molecules of the resin and have the effect of expanding the intermolecular distance and weakening crystallization of the resin, and by adding a plasticizer during resin molding, the resin can be softened and made more workable. Accordingly, if a resin product is dipped in a fatty acid ester, there is a possibility that the fatty acid ester may penetrate between molecules of the resin product, causing swelling of the resin product. In particular, that swelling action is more likely to occur in vinyl chloride tubes than other resin tubes. Fatty acid esters used as plasticizers commonly have side chains with 2 or fewer carbon atoms, and for example, fatty acid esters having an aromatic ring such as esters of a divalent acid such as adipic acid and a monohydric alcohol are widely used.

Fatty acid ester-based solvents represented by general formula (1) can prevent the degradation of resin products such as vinyl chloride tubes. In these fatty acid ester-based solvents, because $R^1$ and $R^2$ are both alkyl groups having a reasonable length and at least one of $R^1$ and $R^2$ has a side chain of 4 or more carbon atoms, the solvent has a very bulky structure, which can prevent the fatty acid ester-based solvent from penetrating into the vinyl chloride, thereby preventing swelling of the vinyl chloride.

For example, in the case where this fatty acid ester-based solvent has a structure in which at least one of $R^1$ and $R^2$ is a branched alkyl group having a side chain of 4 or more carbon atoms, and the other is an alkyl group having 5 or more, or 6 or more, carbon atoms, the overall structure of the fatty acid ester-based solvent becomes a trifurcate bulky structure, and swelling of vinyl chloride by the fatty acid ester-based solvent can be better prevented.

In structures having a side chain of 3 or fewer carbon atoms, such as a methyl group, in the terminal portion of $R^1$ and/or $R^2$ of the fatty acid ester-based solvent, because the structure of the fatty acid ester-based solvent does not become sufficiently bulky, there is a possibility that the solvent may cause swelling of vinyl chloride.

By ensuring that the number of carbon atoms per molecule of the fatty acid ester-based solvent is not more than 29, the ink is able to penetrate rapidly into the interior of the recording medium following discharge of the ink onto the recording medium. In inkjet printing, following discharge of the ink onto the recording medium, the ink penetrates into the interior of the recording medium and dries. Inside an inkjet printing device, following discharge of the ink onto the recording medium, the recording medium is transported by being sandwiched between a pair of rollers. If ink from the recording medium adheres to the roller that contacts the printed surface, then that ink is sometimes transferred from the roller and readhered to a following print region or a subsequent recording medium, causing ink contamination on the recording medium. Accordingly, it is important that following discharge of the ink onto the recording medium, the solvent penetrates rapidly into the interior of the recording medium and dries.

In the case of pigment inks, the image density can be enhanced by retaining the pigment at the surface of the recording medium following ink discharge, and therefore it is desirable that following ink discharge, the solvent penetrates into the interior of the recording medium while the pigment is retained at the recording medium surface. Pigment at the surface of the recording medium is more likely to adhere to the roller and cause roller transfer contamination, but by using the fatty acid ester-based solvent represented by general formula (1), roller transfer contamination can be prevented.

The ink contains a pigment.

Organic pigments such as azo pigments, phthalocyanine pigments, polycyclic pigments and dye lake pigments, and inorganic pigments such as carbon blacks and metal oxides may be used as the pigment. Examples of the azo pigments include soluble azo lake pigments, insoluble azo pigments and condensed azo pigments. Examples of the phthalocyanine pigments include metal phthalocyanine pigments such as copper phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

From the viewpoints of the discharge stability and storage stability, the average particle size of the pigment is preferably not more than 300 nm, more preferably not more than 200 nm, even more preferably not more than 150 nm, and most preferably 100 nm or less.

The amount of the pigment is typically from 0.01 to 20% by mass relative to the total mass of the ink, and from the viewpoints of the print density and ink viscosity, is preferably from 1 to 15% by mass, and more preferably from 4 to 10% by mass.

In order to ensure stable dispersion of the pigment in the ink, a pigment dispersant may be used together with the pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and V220 (a vinylpyrrolidone-eicosene copolymer) (both product names), manufactured by ISP Japan Ltd.; Solsperse 13940 (a polyester amine-based dispersant), 16000, 17000 and 18000 (fatty acid amine-based dispersants), and 11200, 24000 and 28000 (all product names), manufactured by The Lubrizol Corporation; Efka 400, 401, 402, 403, 450, 451 and 453 (modified polyacrylates), and 46, 47, 48, 49, 4010 and 4055 (modified polyurethanes) (all product names), manufactured by BASF Japan Ltd.; Disparlon KS-860 and KS-873N4 (polyester amine salts) (both product names), manufactured by Kusumoto Chemicals, Ltd.; Discol 202, 206, OA-202 and OA-600 (multi-chain polymeric nonionic dispersants) (all product names), manufactured by DKS Co., Ltd.; DISPERBYK 2155 and 9077 (both product names), manufactured by BYK Japan K.K.; and Hypermer KD2, KD3, KD11 and KD12 (all product names), manufactured by Croda Japan K.K. These pigment dispersants may be used individually, or a combination of two or more pigment dispersants may be used.

The amount of the pigment dispersant need only be sufficient to enable satisfactory dispersion of the pigment within the ink, and may be set as appropriate. For example, the pigment dispersant is typically added in a mass ratio within a range from 0.1 to 5, and preferably from 0.1 to 1, relative to a value of 1 for the pigment. Further, the pigment dispersant is typically added in an amount of 0.01 to 10% by mass, and preferably from 0.1 to 6% by mass, relative to the total mass of the ink.

The non-aqueous solvent contains the fatty acid ester-based solvent represented by the above general formula (1). By using this fatty acid ester-based solvent, degradation of resin products can be prevented. Further, roller transfer contamination can also be prevented.

In general formula (1), each of $R^1$ and $R^2$ independently represents an alkyl group. $R^1$ is an alkyl group of 5 or more carbon atoms, and $R^2$ is an alkyl group of 6 or more carbon atoms. Further, at least one of $R^1$ and $R^2$ is a branched alkyl group of 9 or more carbon atoms having a side chain of 4 or more carbon atoms.

One of $R^1$ and $R^2$ may be a linear alkyl group, while the other of $R^1$ and $R^2$ has a side chain of 4 or more carbon atoms. Alternatively, $R^1$ and $R^2$ may both have a side chain of 4 or more carbon atoms. Provided that one of $R^1$ and $R^2$ is a branched alkyl group having a side chain of 4 or more carbon atoms, the other of $R^1$ and $R^2$ may have a side chain of 3 or fewer carbon atoms.

Further, each of $R^1$ and $R^2$ preferably independently has either one or two side chains of 4 or more carbon atoms, but may have three or more such side chains.

For each of $R^1$ and $R^2$, the main chain is deemed to be the carbon chain having the largest number of carbon atoms counting from the carbon atom that is bonded to the ester linkage (—COO—). A carbon chain that branches from this main chain of $R^1$ and $R^2$ is deemed a side chain. When $R^1$ and/or $R^2$ has a side chain, each side chain may be linear or branched.

Further, in $R^1$ and $R^2$, in those cases where a plurality of carbon chains exist that have the largest number of carbon atoms counting from the carbon atom bonded to the ester linkage, the carbon chain having a side chain with the most carbon atoms is deemed to be the main chain.

Furthermore, in $R^1$ and $R^2$, in those cases where a plurality of carbon chains exist that have the largest number of carbon atoms counting from the carbon atom bonded to the ester linkage, and the number of carbon atoms in the each of the side chains contained within the plurality of carbon chains is the same, the carbon chain having the fewest number of side chains is deemed to be the main chain.

The number of carbon atoms per molecule of the fatty acid ester-based solvent is preferably at least 18, more preferably at least 20, even more preferably at least 22, and still more preferably 24 or more. Ensuring that the number of carbon atoms in the fatty acid ester-based solvent satisfies this range ensures a satisfactory number of carbon atoms in the overall alkyl group and a satisfactory number of carbon atoms in the side chain, meaning the fatty acid ester-based solvent is bulky, and degradation of resin products can be prevented.

Further, by ensuring that the number of carbon atoms per molecule of the fatty acid ester-based solvent satisfies this range, the odor associated with the fatty acid ester-based solvent itself can be reduced, meaning the odor generated from the ink can also be reduced. A number of carbon atoms per molecule of the fatty acid ester-based solvent of 24 or more is particularly preferred in terms of reducing the odor.

Further, the number of carbon atoms per molecule of the fatty acid ester-based solvent is preferably not more than 29, more preferably not more than 28, and even more preferably 26 or fewer. Because the viscosity increases as the number of carbon atoms increases, ensuring that the number of carbon atoms in the fatty acid ester-based solvent satisfies the above range enables the viscosity of the ink to be lowered, and can prevent roller transfer contamination.

The total number of carbon atoms in the alkyl group of $R^1$ is preferably at least 5. Further, the total number of carbon atoms in the alkyl group of $R^2$ is preferably at least 6.

By ensuring that the alkyl groups of both the fatty acid portion and the alcohol portion of the fatty acid ester-based solvent have a certain length, the fatty acid ester-based solvent becomes more bulky, penetration of the solvent into resin products can be prevented, meaning degradation of resin products can be prevented.

When $R^1$ is a branched alkyl group having a side chain of 4 or more carbon atoms, the total number of carbon atoms in $R^1$ is preferably at least 9, more preferably at least 11, even more preferably at least 13, and still more preferably 15 or more. In this case, the total number of carbon atoms in $R^1$ is preferably not more than 22, and more preferably 20 or fewer.

When $R^1$ is a linear alkyl group or a branched alkyl group having a side chain of 3 or fewer carbon atoms, the total number of carbon atoms in $R^1$ is preferably at least 5, more preferably at least 7, even more preferably at least 8, and still more preferably 11 or more. In this case, the total number of carbon atoms in $R^1$ is preferably not more than 19, and more preferably 15 or fewer.

When $R^2$ is a branched alkyl group having a side chain of 4 or more carbon atoms, the total number of carbon atoms in $R^2$ is preferably at least 9, more preferably at least 12, even more preferably at least 13, and still more preferably 16 or more. In this case, the total number of carbon atoms in $R^2$ is preferably not more than 23, more preferably not more than 22, and even more preferably 20 or fewer.

When $R^2$ is a linear alkyl group or a branched alkyl group having a side chain of 3 or fewer carbon atoms, the total number of carbon atoms in $R^2$ is preferably at least 6, more preferably at least 8, and even more preferably 9 or more. In this case, the total number of carbon atoms in $R^2$ is preferably not more than 19, and more preferably 14 or fewer.

The total numbers of carbon atoms in $R^1$ and $R^2$ may be adjusted in accordance with the respective lengths of the main chains, the number of carbon atoms in any side chains, and the total number of carbon atoms in the fatty acid ester-based solvent.

Further, ensuring that the alkyl group $R^1$ of the fatty acid portion and the alkyl group $R^2$ of the alcohol portion of the fatty acid ester-based solvent both have a certain length means that when the fatty acid ester-based solvent decomposes into a fatty acid and an alcohol, the molecular weights of the alkyl groups of the decomposition products are reasonably large, meaning the problem of decomposition products volatilizing and causing odors can be prevented. Fatty acid ester-based solvents tend to absorb moisture from the atmosphere, and can suffer from decomposition, particularly when stored under high-temperature conditions.

In order to reduce odors, the total number of carbon atoms in each of $R^1$ and $R^2$ of the fatty acid ester-based solvent is, independently, preferably at least 6, more preferably at least 8, and even more preferably 9 or more. It is more preferable that the total number of carbon atoms in both $R^1$ and $R^2$ is at least 6, more preferably at least 8, and even more preferably 9 or more.

Furthermore, the odor of the fatty acid ester-based solvent itself can also be reduced by ensuring that the alkyl group $R^1$ of the fatty acid portion and the alkyl group $R^2$ of the alcohol portion both have a certain length.

At least one of $R^1$ and $R^2$ is preferably a branched alkyl group of 9 or more carbon atoms having a side chain of 4 or more carbon atoms.

The number of carbon atoms in the side chain of the branched alkyl group is preferably at least 4, and more preferably 6 or more. This ensures that the fatty acid ester-based solvent has a bulky structure, and enables the degradation of resin products to be prevented.

Further, although there are no particular limitations on the number of carbon atoms in the side chain of the branched alkyl group, the number of carbon atoms may be not more than 11, and is preferably not more than 10, and more preferably 8 or fewer.

The side chain of 4 or more carbon atoms may be either a linear alkyl group or a branched alkyl group. The side chain preferably contains a carbon chain in which at least 4 carbon atoms, and preferably 6 or more carbon atoms, are bonded in a linear chain. For example, the side chain is preferably a linear alkyl group of at least 4 carbon atoms, and more preferably 6 or more carbon atoms.

Examples of the side chain of 4 or more carbon atoms include an n-butyl group, isobutyl group, tert-butyl group, pentyl group, hexyl group, heptyl group, octyl group, isooctyl group, nonyl group and decyl group.

An n-butyl group, hexyl group or octyl group is preferred, and an n-butyl group or hexyl group is more preferred.

Examples of the fatty acid ester-based solvent represented by general formula (1) include esterified products of 2-butyloctanol and hexanoic acid, heptanoic acid, octanoic acid, 2-ethylhexanoic acid, nonanoic acid, decanoic acid, dodecanoic acid, tetradecanoic acid, pentadecanoic acid, hexadecanoic acid or heptadecanoic acid; esterified products of 2-hexyldecanol and hexanoic acid, heptanoic acid, octanoic acid, 2-ethylhexanoic acid, nonanoic acid, decanoic acid or dodecanoic acid; esterified products of 2-octyldodecanol and hexanoic acid, heptanoic acid, octanoic acid, 2-ethylhexanoic acid or nonanoic acid; esterified products of 2-butyloctanoic acid and hexanol, heptanol, octanol, 2-ethylhexanol, nonanol, decanol, undecanol, dodecanol, tridecanol, tetradecanol, hexadecanol or heptadecanol; esterified products of 2-hexyldecanoic acid and hexanol, heptanol, octanol, 2-ethylhexanol, nonanol, decanol, undecanol, dodecanol or tridecanol; esterified products of 2-octyldodecanoic acid and hexanol, heptanol, octanol, 2-ethylhexanol or nonanol; esterified products of 2-butyloctanoic acid and 2-butyloctanol or 2-hexyldecanol; and the esterified product of 2-hexyldecanoic acid and 2-butyloctanol.

Specific examples of the fatty acid ester-based solvent represented by general formula (1) include 2-butyloctyl heptanoate, 2-octyldodecyl octanoate, 2-butyloctyl 2-ethylhexanoate, 2-hexyldecyl 2-ethylhexanoate, 2-hexyldecyl nonanoate, 2-hexyldecyl dodecanoate, 2-butyloctyl tetradecanoate, 2-butyloctyl hexadecanoate, octyl 2-butyloctanoate, hexyl 2-hexyldecanoate, octyl 2-hexyldecanoate, dodecyl 2-butyloctanoate, nonyl 2-hexyldecanoate, tetradecyl 2-butyloctanoate, 2-butyloctyl 2-butyloctanoate, hexadecyl 2-butyloctanoate, and dodecyl 2-hexyldecanoate.

These fatty acid ester-based solvents may be used individually, or a combination of two or more solvents may be used.

There are no particular limitations on the amount of the fatty acid ester-based solvent represented by general formula (1) relative to the total mass of non-aqueous solvent, but the amount is preferably at least 10% by mass.

From the viewpoint of preventing the degradation of resin products, in order to eliminate the effects of other solvents, the amount of the fatty acid ester-based solvent represented by general formula (1) relative to the total mass of non-aqueous solvent is preferably at least 50% by mass, more preferably at least 55% by mass, even more preferably at least 80% by mass, and may, for example, be 85% by mass or more, or even 100% by mass.

The amount added of the fatty acid ester-based solvent represented by general formula (1) relative to the total mass of the ink varies depending on the amount used of the total non-aqueous solvent, but is typically within a range from 10 to 98% by mass, and may be from 15 to 90% by mass.

The amount of the fatty acid ester-based solvent represented by general formula (1) relative to the total mass of the ink is preferably at least 20% by mass, more preferably at least 30% by mass, even more preferably at least 50% by mass, and still more preferably 55% by mass or more. This enables even better prevention of resin product degradation.

The amount added of fatty acid ester-based solvents of 30 or more carbon atoms in the ink is preferably restricted. For example, the amount added of fatty acid ester-based solvents of 30 or more carbon atoms relative to the total mass of the ink is preferably not more than 70% by mass, more preferably not more than 40% by mass, even more preferably not more than 20% by mass, and still more preferably 10% by mass or less. This reduces the stickiness of the ink applied to a printed item, and can further improve roller transfer contamination.

Moreover, in those cases where the ink contains a fatty acid ester-based solvent having 30 or more carbon atoms, the amount of the fatty acid ester-based solvent represented by general formula (1) relative to the total mass of the ink is preferably at least 50% by mass, more preferably at least 60% by mass, even more preferably at least 80% by mass, and still more preferably 90% by mass or more.

Although not limited to the following method, the fatty acid ester-based solvent represented by general formula (1) described above can be produced using the method described below.

The fatty acid ester-based solvent can be obtained by reacting a fatty acid and an alcohol. A compound having a side chain of 4 or more carbon atoms can be used as for at least one of the fatty acid and alcohol raw materials. Further, in order to introduce a side chain of 4 or more carbon atoms into $R^2$, a secondary alcohol of 10 or more carbon atoms having the hydroxyl group located at position 5 or higher can be used.

The reaction temperature may be adjusted within a range from 80 to 230° C. in accordance with the types of fatty acid and alcohol used. The reaction time may be adjusted within a range from 1 to 48 hours in accordance with the types of fatty acid and alcohol used, and the amounts used of the raw materials. The moisture produced during the esterification reaction is preferably removed.

The fatty acid and the alcohol are preferably reacted in a molar ratio of 1:1.

During the reaction, an appropriate amount of a catalyst such as concentrated sulfuric acid, p-toluenesulfonic acid or methanesulfonic acid may be used.

Examples of fatty acids having a side chain that may be used as a raw material include 2-butyloctanoic acid, 2-hexyldecanoic acid and 2-octyldodecanoic acid.

Examples of linear fatty acids that may be used as a raw material include pentanoic acid, hexanoic acid, heptanoic acid, octanoic acid, nonanoic acid, decanoic acid, undecanoic acid, dodecanoic acid, tetradecanoic acid, hexadecanoic acid and octadecanoic acid.

Examples of alcohols having a side chain that may be used as a raw material include 2-butyl-1-octanol, 2-hexyl-1-decanol, and 2-octyl-1-dodecanol.

Examples of linear alcohols of 10 or more carbon atoms having the hydroxyl group located at position 5 or higher that may be used as a raw material include 5-nonanol, 5-decanol, 5-undecanol, and 7-tetradecanol.

Examples of linear alcohols that may be used as a raw material include 1-hexanol, 1-heptanol, 1-octanol, 1-nonanol, 1-decanol, 1-undecanol, 1-dodecanol, 1-tetradecanol, 1-hexadecanol, and 1-octadecanol.

The ink may also contain one or more other non-aqueous solvents.

Both non-polar organic solvents and polar organic solvents can be used as these other non-aqueous solvents. In the embodiments of the present invention, a water-insoluble organic solvent that does not mix uniformly with an equal volume of water at 1 atmosphere and 20° C. is preferably used as the non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (all manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include fatty acid ester-based solvents, higher alcohol-based solvents and higher fatty acid-based solvents.

Specific examples of the fatty acid ester-based solvents include solvents having a total of at least 12 carbon atoms, and preferably 16 to 30 carbon atoms, including solvents having a linear alkyl group such as methyl laurate, hexyl laurate, hexyl palmitate, methyl oleate, ethyl oleate, butyl oleate, hexyl oleate, methyl linoleate, ethyl linoleate, butyl stearate, hexyl stearate, methyl soybean oil and methyl tallate, and solvents having an alkyl group with a side chain of 3 or fewer carbon atoms, such as isodecyl isononanoate, isotridecyl isononanoate, isopropyl isostearate, isononyl isononanoate, isopropyl laurate, isopropyl myristate, isopropyl palmitate, isooctyl palmitate, isopropyl oleate, isobutyl linoleate, isooctyl stearate, isobutyl soybean oil and isobutyl tallate; as well as solvents having 31 or more carbon atoms such as isostearyl palmitate (34 carbon atoms).

Among those fatty acid ester-based solvents that are generally available commercially, isodecyl isononanoate (19 carbon atoms), isotridecyl isononanoate (22 carbon atoms), and isopropyl isostearate (21 carbon atoms) and the like are examples of fatty acid ester-based solvents having an alkyl group with a side chain of 1 carbon atom.

Examples of the higher alcohol-based solvents include higher alcohol-based solvents having at least 6 carbon atoms, and preferably 12 to 20 carbon atoms, within one molecule, such as isomyristyl alcohol, isopalmityl alcohol, isostearyl alcohol, oleyl alcohol, isoeicosyl alcohol and decyltetradecanol.

Examples of the higher fatty acid-based solvents include higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher.

These non-aqueous solvents having a boiling point of 250° C. or higher also include non-aqueous solvents that do not exhibit an actual boiling point.

These non-aqueous solvents may be used individually, or a combination of two or more solvents may be used, provided the solvents form a single phase.

When another non-aqueous solvent is used in addition to the fatty acid ester-based solvent represented by general formula (1), the use of a high-boiling point solvent is preferred. This high-boiling point solvent is preferably a non-polar solvent having an initial boiling point of at least 200° C., a polar solvent having a boiling point of 250° C. or higher, or a combination of the two.

In addition to the various components described above, the oil-based ink may also include various additives, provided the effects of the present invention are not impaired. For example, additives such as nozzle blockage inhibitors, antioxidants, conductivity adjusters, viscosity adjusters, surface tension adjusters, and oxygen absorbers and the like may be added as appropriate. Further, a dye may be used in combination with the pigment to adjust the ink coloring. There are no particular limitations on these additives, and materials typically used in this technical field may be used.

The ink can be produced by mixing the various components including the colorant and the non-aqueous solvent. The ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

The ideal range for the viscosity of the oil-based inkjet ink varies depending on factors such as the diameter of the nozzles within the discharge head of the inkjet recording system and the discharge environment, but generally, the viscosity at 23° C. is preferably within a range from 5 to 30 mPa·s, and more preferably from 5 to 15 mPa·s.

There are no particular limitations on the printing method used with the inkjet ink, and any of various printing systems, including a piezo system, electrostatic system or thermal system may be used. In those cases where an inkjet recording device is used, the ink of the present invention is preferably discharged from the inkjet head based on a digital signal, with the discharged ink droplets being adhered to a recording medium.

Because an ink according to one embodiment has low viscosity that is suitable for discharge from inkjet nozzles, while enabling prevention of the swelling of resin products, the ink can be discharged favorably in the vicinity of normal temperature (23° C.).

In one embodiment, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail using a series of examples. However, the present invention is in no way limited by the following examples.

[Synthesis of Fatty Acid Esters]

Formulations of fatty acid esters are shown in Table 1.

A fatty acid and an alcohol were placed in a four-neck flask in accordance with the formulation shown in Table 1 and mixed together to obtain a uniform solution. The four-neck flask was fitted with a Dean-Stark apparatus to enable removal of the water that was generated as the raw materials reacted. An appropriate amount of sulfuric acid was added as a catalyst to the four-neck flask containing the uniform solution, and the entire system was then heated. The heating temperature was set within a range from 80° C. to 230° C. in accordance with the types of fatty acid and alcohol. The heated reaction time was set within a range from 1 to 48 hours. Following reaction, in order to remove any unreacted raw materials and impurities, the obtained solution was distilled under reduced pressure to obtain the target fatty acid ester. The fatty acid and the alcohol were mixed in a molar ratio of 1:1. The fatty acids and the alcohols can be obtained from Tokyo Chemical Industry Co., Ltd., FUJIFILM Wako Pure Chemical Corporation, and Sasol Group.

TABLE 1

| No. | Fatty acid ester | Fatty acid | Alcohol |
|---|---|---|---|
| 1 | 2-butyloctyl heptanoate | heptanoic acid | 2-butyloctanol |
| 2 | 2-butyloctyl 2-ethylhexanoate | 2-ethylhexanoic acid | 2-butyloctanol |
| 3 | octyl 2-butyloctanoate | 2-butyloctanoic acid | octanol |
| 4 | hexyl 2-hexyldecanoate | 2-hexyldecanoic acid | hexanol |
| 5 | 2-hexyldecyl 2-ethylhexanoate | 2-ethylhexanoic acid | 2-hexyldecanol |
| 6 | octyl 2-hexyldecanoate | 2-hexyldecanoic acid | octanol |
| 7 | dodecyl 2-butyloctanoate | 2-butyloctanoic acid | dodecanol |
| 8 | 2-butyloctyl 2-butyloctanoate | 2-butyloctanoic acid | 2-butyloctanol |
| 9 | nonyl 2-hexyldecanoate | 2-hexyldecanoic acid | nonanol |
| 10 | 2-hexyldecyl nonanoate | nonanoic acid | 2-hexyldecanol |
| 11 | tetradecyl 2-butyloctanoate | 2-butyloctanoic acid | tetradecanol |
| 12 | 2-butyloctyl tetradecanoate | tetradecanoic acid | 2-butyloctanol |
| 13 | 2-hexyldecyl dodecanoate | dodecanoic acid | 2-hexyldecanol |
| 14 | 2-octyldodecyl octanoate | octanoic acid | 2-octyldodecanol |
| 15 | hexyl undecanoate | undecanoic acid | hexanol |
| 16 | 11-methyldodecyl 3,5,5-trimethylhexanoate | 3,5,5-trimethylhexanoic acid | 11-methyldodecanol |
| 17 | butyl 2-hexyldecanoate | 2-hexyldecanoic acid | butanol |
| 18 | 2-ethylhexyl hexadecanoate | hexadecanoic acid | 2-ethylhexanol |
| 19 | 2-octyldodecyl pivalate | pivalic acid | 2-octyldodecanol |
| 20 | octadecyl 2-butyloctanoate | 2-butyloctanoic acid | octadecanol |
| 21 | 2-octyldodecyl neodecanoate | neodecanoic acid | 2-octyldodecanol |

[Preparation of Inks]

Ink formulations are shown in Table 2, Table 3 and Table 4. The number of carbon atoms per molecule of the fatty acid ester, and the number of carbon atoms, the number of side chains and the number of carbon atoms in each side chain for each of $R^1$ and $R^2$ are also shown in each table.

The pigments, pigment dispersants, and solvents were mixed together in accordance with the amounts shown in each table, and the pigment was dispersed thoroughly using a beads mill (Dyno-Mill KDL-A, manufactured by Shinmaru Enterprises Corporation) under conditions including a residence time of 15 minutes. Subsequently, coarse particles were removed with a membrane filter to obtain the ink.

The components used were as follows.
(Pigments)
Carbon black: MA77, manufactured by Mitsubishi Chemical Corporation.
Copper phthalocyanine blue: FASTOGEN Blue LA5380, manufactured by DIC Corporation.
(Pigment Dispersants)
Solsperse 13940: manufactured by The Lubrizol Corporation, non-volatile fraction: 40% by mass.
Solsperse 18000: manufactured by The Lubrizol Corporation, non-volatile fraction: 100% by mass.
(Hydrocarbon Solvent)
Hydrocarbon solvent Exxsol D110: manufactured by Exxon Mobil Corporation
[Evaluations]
The inks from each of the examples and comparative examples described above were evaluated using the methods described below. The evaluation results are shown in Table 2, Table 3 and Table 4.

(Vinyl Chloride Tube Swelling Characteristics)
A vinyl chloride tube having an inner diameter of 2.38 mm and an external diameter of 4.76 mm was cut to lengths of 5 cm to prepare test pieces. One of these test piece was immersed in each ink, and stored at room temperature for one week. Using the values for the mass a of the test piece prior to storage and the mass b of the test piece following storage, the change in mass [(b−a)/a×100] was determined.
AA: less than +3.0%
A: at least +3.0%, but less than +5.0%
B: at least +5.0% but less than +10.0%
C: +10.0% or greater
(Roller Transfer Contamination)
A nitrile rubber (NBR) transport roller was fitted in the transport path of an inkjet printer ORPHIS EX9050 (manufactured by RISO KAGAKU CORPORATION) in a position that faced and made contact with the printed surface of printed items at a location downstream from the inkjet head in the printed item transport direction. Each of the inks was loaded into the inkjet printer, and a solid image was printed using a plain paper "RISO Paper Thin Type" (manufactured by RISO KAGAKU CORPORATION) as the recording medium. One hundred copies of the image were printed continuously, and the level of roller transfer contamination on the 100th printed item was evaluated visually against the following criteria.
A: no contamination is noticeable on the printed item
B: the printed item seems contaminated
C: the printed item is clearly contaminated
(Ink Odor)
The ink odor was evaluated using the following criteria. The odor evaluation was performed by having 10 panelists smell the ink directly and perform a sensory evaluation against the following criteria. The evaluation result was recorded as the average of the evaluation results from the 10 panelists.
A: odor is of a level that is almost undetectable
B: odor is of a level that is slightly noticeable
C: odor is of a noticeable level
Although a detailed description is not provided here, printing using the inks of each of the examples was able to produce printed items of satisfactory image density. Further, the viscosity of the ink from each example was also appropriate.

TABLE 2

Ink formulations and evaluation results

| | Units: % by mass | Number of carbon atoms per molecule | R¹ Number of carbon atoms | R¹ Number of side chains | R¹ Number of carbon atoms in side chain | R² Number of carbon atoms | R² Number of side chains | R² Number of carbon atoms in side chain | Example 1 | Example 2 |
|---|---|---|---|---|---|---|---|---|---|---|
| Pigments | Carbon black | | | | | | | | 5.0 | 5.0 |
| | Copper phthalocyanine blue | | | | | | | | — | — |
| Pigment dispersants | Solsperse 13940 (Active component: 40%) | | | | | | | | 5.0 (2.0) | 5.0 (2.0) |
| | Solsperse 18000 | | | | | | | | — | — |
| Fatty acid esters | (1) 2-butyloctyl heptanoate | 19 | 6 | 0 | 0 | 12 | 1 | 4 | 80.0 | — |
| | (2) 2-butyloctyl 2-ethylhexanoate | 20 | 7 | 1 | 2 | 12 | 1 | 4 | — | 80.0 |
| | (3) octyl 2-butyloctanoate | 20 | 11 | 1 | 4 | 8 | 0 | 0 | — | — |
| | (4) hexyl 2-hexyldecanoate | 22 | 15 | 1 | 6 | 6 | 0 | 0 | — | — |
| | (5) 2-hexyldecyl 2-ethylhexanoate | 24 | 7 | 1 | 2 | 16 | 1 | 6 | — | — |
| | (6) octyl 2-hexyldecanoate | 24 | 15 | 1 | 6 | 8 | 0 | 0 | — | — |
| | (7) dodecyl 2-butyloctanoate | 24 | 11 | 1 | 4 | 12 | 0 | 0 | — | — |
| | (8) 2-butyloctyl 2-butyloctanoate | 24 | 11 | 1 | 4 | 12 | 1 | 4 | — | — |
| Hydrocarbon solvent Exxsol D110 | | | | | | | | | 10.0 | 10.0 |
| Total (% by mass) | | | | | | | | | 100.0 | 100.0 |
| Vinyl chloride tube swelling characteristics | | | | | | | | | B | B |
| Roller transfer contamination | | | | | | | | | A | A |
| Ink odor | | | | | | | | | B | B |

| | | | Example 3 | Example 4 | Example 5 | Example 6 | Example 7 | Example 8 |
|---|---|---|---|---|---|---|---|---|
| | Pigments | Carbon black | 5.0 | 5.0 | 5.0 | 5.0 | 5.0 | 5.0 |
| | | Copper phthalocyanine blue | — | — | — | — | — | — |
| | Pigment dispersants | Solsperse 13940 (Active component: 40%) | 5.0 (2.0) | 5.0 (2.0) | 5.0 (2.0) | 5.0 (2.0) | 5.0 (2.0) | 5.0 (2.0) |
| | | Solsperse 18000 | — | — | — | — | — | — |
| | Fatty acid esters | (1) 2-butyloctyl heptanoate | — | — | — | — | — | — |
| | | (2) 2-butyloctyl 2-ethylhexanoate | — | — | — | — | — | — |
| | | (3) octyl 2-butyloctanoate | 80.0 | — | — | — | — | — |
| | | (4) hexyl 2-hexyldecanoate | — | 80.0 | — | — | — | — |
| | | (5) 2-hexyldecyl 2-ethylhexanoate | — | — | 80.0 | — | — | — |
| | | (6) octyl 2-hexyldecanoate | — | — | — | 80.0 | — | — |
| | | (7) dodecyl 2-butyloctanoate | — | — | — | — | 80.0 | — |
| | | (8) 2-butyloctyl 2-butyloctanoate | — | — | — | — | — | 80.0 |
| | Hydrocarbon solvent Exxsol D110 | | 10.0 | 10.0 | 10.0 | 10.0 | 10.0 | 10.0 |
| | Total (% by mass) | | 100.0 | 100.0 | 100.0 | 100.0 | 100.0 | 100.0 |
| | Vinyl chloride tube swelling characteristics | | B | A | A | A | B | B |
| | Roller transfer contamination | | A | A | A | A | A | A |
| | Ink odor | | B | B | A | A | A | A |

TABLE 3

Ink formulations and evaluation results

| Units: % by mass | | | R¹ Number of carbon atoms per molecule | R¹ Number of carbon atoms | R¹ Number of side chains | R¹ Number of carbon atoms in side chain | R² Number of carbon atoms | R² Number of side chains | R² Number of carbon atoms in side chain | Example 9 | Example 10 | Example 11 | Example 12 | Example 13 | Example 14 | Example 15 | Example 16 | Example 17 |
|---|---|---|---|---|---|---|---|---|---|---|---|---|---|---|---|---|---|---|
| Pigments | Carbon black | | | | | | | | | 5.0 | 5.0 | 5.0 | 5.0 | 5.0 | 5.0 | — | 5.0 | 5.0 |
| | Copper phthalocyanine blue | | | | | | | | | — | — | — | — | — | — | 4.0 | — | — |
| Pigment dispersants | Solsperse 13940 (Active component: 40%) | | | | | | | | | 5.0 (2.0) | 5.0 (2.0) | 5.0 (2.0) | 5.0 (2.0) | 5.0 (2.0) | 5.0 (2.0) | — | 5.0 (2.0) | 5.0 (2.0) |
| | Solsperse 18000 | | | | | | | | | — | — | — | — | — | — | 3.5 | — | — |
| Fatty acid esters | (9) nonyl 2-hexyldecanoate | 25 | 15 | 1 | 6 | 9 | 0 | 0 | 80.0 | — | — | — | — | — | 82.5 | 40.0 | 30.0 |
| | (10) 2-hexyldecyl nonanoate | 25 | 8 | 0 | 0 | 16 | 1 | 6 | — | 80.0 | — | — | — | — | — | 40.0 | — |
| | (11) tetradecyl 2-butyloctanoate | 26 | 11 | 1 | 4 | 14 | 0 | 0 | — | — | 80.0 | — | — | — | — | — | — |
| | (12) 2-butyloctyl tetradecanoate | 26 | 13 | 0 | 0 | 12 | 1 | 4 | — | — | — | 80.0 | — | — | — | — | — |
| | (13) 2-hexyldecyl dodecanoate | 28 | 11 | 0 | 0 | 16 | 1 | 6 | — | — | — | — | 80.0 | — | — | — | — |
| | (14) 2-octyldodecyl octanoate | 28 | 7 | 0 | 0 | 20 | 1 | 8 | — | — | — | — | — | 80.0 | — | — | — |
| Hydrocarbon solvent Exxsol D110 | | | | | | | | | | 10.0 | 10.0 | 10.0 | 10.0 | 10.0 | 10.0 | 10.0 | 10.0 | 60.0 |
| Total (% by mass) | | | | | | | | | | 100.0 | 100.0 | 100.0 | 100.0 | 100.0 | 100.0 | 100.0 | 100.0 | 100.0 |
| Vinyl chloride tube swelling characteristics | | | | | | | | | | AA | AA | B | B | AA | AA | AA | AA | B |
| Roller transfer contamination | | | | | | | | | | A | A | A | A | B | B | A | A | A |
| Ink odor | | | | | | | | | | A | A | A | A | A | A | A | A | A |

TABLE 4

Ink formulations and evaluation results

| | Units: % by mass | Number of carbon atoms per molecule | R¹ Number of carbon atoms | R¹ Number of side chains | R¹ Number of carbon atoms in side chains | R² Number of carbon atoms | R² Number of side chains | R² Number of carbon atoms in side chain | Comparative Example 1 |
|---|---|---|---|---|---|---|---|---|---|
| Pigments | Carbon black | | | | | | | | 5.0 |
| | Copper phthalocyanine blue | | | | | | | | — |
| Pigment dispersants | Solsperse 13940 (Active component: 40%) | | | | | | | | 5.0 (2.0) |
| | Solsperse 18000 | | | | | | | | — |
| Comparative fatty acid esters | (15) hexyl undecanoate | 17 | 10 | 0 | 0 | 6 | 0 | 0 | 80.0 |
| | (16) 11-methyldodecyl 3,5,5-trimethylhexanoate | 22 | 8 | 3 | 1, 1, 1 | 13 | 1 | 1 | — |
| | (17) butyl 2-hexyldecanoate | 20 | 15 | 1 | 6 | 4 | 0 | 0 | — |
| | (18) 2-ethylhexyl hexadecanoate | 24 | 15 | 0 | 0 | 8 | 1 | 2 | — |
| | (19) 2-octyldodecyl pivalate | 25 | 4 | 3 | 1, 1, 1 | 20 | 1 | 8 | — |
| | (20) octadecyl 2-butyloctanoate | 30 | 11 | 1 | 4 | 18 | 0 | 0 | — |
| | (21) 2-octyldodecyl neodecanoate | 30 | 9 | 3 | 1, 1, 1 | 20 | 1 | 8 | — |
| Hydrocarbon solvent Exxsol D110 | | | | | | | | | 10.0 |
| Total (% by mass) | | | | | | | | | 100.0 |
| Vinyl chloride tube swelling characteristics | | | | | | | | | C |
| Roller transfer contamination | | | | | | | | | A |
| Ink odor | | | | | | | | | C |

| | Units: % by mass | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Pigments | Carbon black | 5.0 | 5.0 | 5.0 | 5.0 | 5.0 | 5.0 | 5.0 |
| | Copper phthalocyanine blue | — | — | — | — | — | — | — |
| Pigment dispersants | Solsperse 13940 (Active component: 40%) | 5.0 (2.0) | 5.0 (2.0) | 5.0 (2.0) | 5.0 (2.0) | 5.0 (2.0) | 5.0 (2.0) | 5.0 (2.0) |
| | Solsperse 18000 | — | — | — | — | — | — | — |
| Comparative fatty acid esters | (15) hexyl undecanoate | — | — | — | — | — | — | — |
| | (16) 11-methyldodecyl 3,5,5-trimethylhexanoate | 80.0 | — | — | — | — | — | — |
| | (17) butyl 2-hexyldecanoate | — | 80.0 | — | — | — | — | — |
| | (18) 2-ethylhexyl hexadecanoate | — | — | 80.0 | — | — | — | — |
| | (19) 2-octyldodecyl pivalate | — | — | — | 80.0 | — | — | — |
| | (20) octadecyl 2-butyloctanoate | — | — | — | — | 80.0 | — | — |
| | (21) 2-octyldodecyl neodecanoate | — | — | — | — | — | 80.0 | — |
| Hydrocarbon solvent Exxsol D110 | | 10.0 | 10.0 | 10.0 | 10.0 | 10.0 | 10.0 | 90.0 |
| Total (% by mass) | | 100.0 | 100.0 | 100.0 | 100.0 | 100.0 | 100.0 | 100.0 |
| Vinyl chloride tube swelling characteristics | | C | C | C | C | B | A | C |
| Roller transfer contamination | | A | A | A | A | C | C | A |
| Ink odor | | B | C | A | C | A | A | A |

As shown in the tables, with the inks of each of the examples, vinyl chloride tube swelling and roller transfer contamination were able to be prevented, and ink odor was also able to be prevented.

The examples revealed that by ensuring the number of carbon atoms in the side chain of $R^1$ or the side chain of $R^2$ was at least 4, and particularly 6 or more, vinyl chloride tube swelling was able to be better prevented.

Further, by ensuring that the number of carbon atoms in $R^1$ was at least 5, and particularly 8 or more, and the number of carbon atoms in $R^2$ was at least 6, and particularly 9 or more, vinyl chloride tube swelling was able to be better prevented.

Furthermore, when the number of carbon atoms per molecule of the fatty acid ester was not more than 29, and particularly 26 or fewer, roller transfer contamination was able to be better prevented.

Further, when the number of carbon atoms per molecule of the fatty acid ester was at least 18, and particularly 24 or more, vinyl chloride tube swelling was able to be better prevented, and ink odor was also able to be better prevented.

Example 15 was an example in which the type of pigment and pigment dispersant were altered, and favorable results were able to be obtained.

Example 16 was an example in which two types of fatty acid ester were used, and favorable results were able to be obtained.

Example 17 was an example in which a fatty acid ester and a hydrocarbon solvent were combined, and although the proportion of the hydrocarbon solvent was high, favorable results were able to be obtained.

The fatty acid ester of Comparative Example 1 had 17 carbon atoms per molecule and $R^1$ and $R^2$ were both linear alkyl groups, and vinyl chloride tube swelling occurred.

The fatty acid esters of Comparative Examples 2 and 4 were examples in which a side chain of 4 or more carbon atoms was not included in either of $R^1$ and $R^2$, and vinyl chloride tube swelling occurred.

In the fatty acid ester of Comparative Example 3, the number of carbon atoms in $R^2$ was a small value of 4, and vinyl chloride tube swelling occurred.

In the fatty acid ester of Comparative Example 5, the number of carbon atoms in $R^1$ was 4, and vinyl chloride tube swelling occurred.

The fatty acid esters of Comparative Examples 6 and 7 each had 30 carbon atoms per molecule, and roller transfer contamination occurred.

Comparative Example 8 did not use a fatty acid ester, and used only a hydrocarbon solvent, and vinyl chloride tube swelling occurred.

Based on the examples and comparative examples, it was evident that as the number of carbon atoms per molecule of the fatty acid ester was reduced, an odor tended to develop. Further, it was also evident that as the numbers of carbon atoms in $R^1$ and $R^2$ of the fatty acid ester were reduced, odors tended to develop.

The invention claimed is:

1. An oil-based inkjet ink comprising a pigment and a fatty acid ester-based solvent represented by general formula (1) shown below and having at least 24 but not more than 28 carbon atoms per molecule:

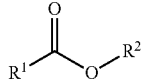

General formula (1)

wherein in general formula (1),
(i) $R^1$ represents a branched alkyl group of 9 or more and 22 or fewer carbon atoms having a linear side chain of 4 or more carbon atoms, and $R^2$ represents a linear alkyl group of 6 or more and 19 or fewer carbon atoms,
(ii) $R^1$ represents a linear alkyl group of 5 or more and 19 or fewer carbon atoms, and $R^2$ represents a branched alkyl group of 9 or more and 23 or fewer carbon atoms having a linear side chain of 4 or more carbon atoms, or
(iii) $R^1$ represents a branched alkyl group of 9 or more and 22 or fewer carbon atoms having a linear side chain of 4 or more carbon atoms, and $R^2$ represents a branched alkyl group of 9 or more and 23 or fewer carbon atoms having a linear side chain of 4 or more carbon atoms.

2. The oil-based inkjet ink according to claim 1, wherein
when (i) is satisfied, $R^1$ represents a branched alkyl group of 13 or more and 22 or fewer carbon atoms having a linear side chain of 6 or more carbon atoms,
when (ii) is satisfied, $R^2$ represents a branched alkyl group of 13 or more and 23 or fewer carbon atoms having a linear side chain of 6 or more carbon atoms, or
when (iii) is satisfied, $R^1$ represents a branched alkyl group of 13 or more and 22 or fewer carbon atoms having a linear side chain of 6 or more carbon atoms, and $R^2$ represents a branched alkyl group of 13 or more and 23 or fewer carbon atoms having a linear side chain of 6 or more carbon atoms.

3. The oil-based inkjet ink according to claim 1, wherein
(i) or (ii) is satisfied, and
when (i) is satisfied, R2 represents a linear alkyl group of 9 or more and 19 or fewer carbon atoms, or
when (ii) is satisfied, R1 represents a linear alkyl group of 8 or more and 19 or fewer carbon atoms.

4. The oil-based inkjet ink according to claim 1, wherein the fatty acid ester-based solvent has 26 or fewer carbon atoms per molecule.

5. The oil-based inkjet ink according to claim 1, wherein (iii) is satisfied.

6. The oil-based inkjet ink according to claim 2, wherein (i) or (ii) is satisfied, and
when (i) is satisfied, R2 represents a linear alkyl group of 9 or more and 19 or fewer carbon atoms, or
when (ii) is satisfied, R1 represents a linear alkyl group of 8 or more and 19 or fewer carbon atoms.

7. The oil-based inkjet ink according to claim 2, wherein the fatty acid ester-based solvent has 26 or fewer carbon atoms per molecule.

8. The oil-based inkjet ink according to claim 3, wherein the fatty acid ester-based solvent has 26 or fewer carbon atoms per molecule.

9. The oil-based inkjet ink according to claim 2, wherein (iii) is satisfied.

10. The oil-based inkjet ink according to claim 4, wherein (iii) is satisfied.

11. The oil-based inkjet ink according to claim 1, further comprising a pigment dispersant in a mass ratio within a range from 0.1 to 5 relative to a value of 1 for the pigment.

* * * * *